United States Patent
Geffers et al.

[11] 3,886,205
[45] May 27, 1975

[54] 2-PHOSPHONO-BUTANE-1,2,4-TRICARBOXYLIC ACIDS

[75] Inventors: Hans Geffers, Cologne; Walter Radt; Hartmut Schulz, both of Leverkusen; Reinhard Schliebs, Cologne, all of Germany

[73] Assignee: Bayer Aktiengesellschaft, Leverkusen, Germany

[22] Filed: Feb. 11, 1974

[21] Appl. No.: 441,550

Related U.S. Application Data

[63] Continuation-in-part of Ser. No. 202,564, Nov. 26, 1971, abandoned.

[30] Foreign Application Priority Data
Dec. 16, 1970 Germany.............................. 2061838

[52] U.S. Cl............... 260/502.4 R; 210/58; 252/94; 252/106; 252/147; 252/DIG. 10; 252/DIG. 11; 252/DIG. 17; 260/501.21; 260/940; 260/942; 260/943; 260/971
[51] Int. Cl. ............................................... C07f 9/38
[58] Field of Search ............................... 260/502.4 R

[56] References Cited
UNITED STATES PATENTS 2,724,718  11/1955  Stiles et al..................... 260/502.4 R
2,957,931  10/1960  Hamilton et al. ............. 260/502.4 R
3,236,863  2/1966  Smith et al.................... 260/502.4 R

*Primary Examiner*—Joseph E. Evans
*Attorney, Agent, or Firm*—Burgess, Dinklage & Sprung

[57] ABSTRACT

2-phosphono-butane-1,2,4-tricarboxylic acids of the general formula

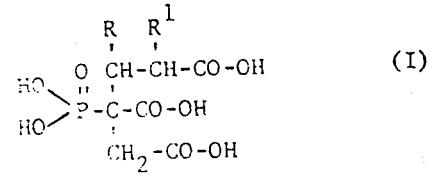

in which
R is hydrogen, lower alkyl or a carboxyl group, and
$R^1$ is hydrogen or methyl, and salts thereof, and their use as complex formers for alkaline earth metal ions.

5 Claims, No Drawings

2-PHOSPHONO-BUTANE-1,2,4-TRICARBOXYLIC ACIDS

This application is a continuation-in-part of application Ser. No. 202,564 filed Nov. 26, 1971, now abandoned.

The present invention relates to and has for its objects the provision of particular new 2-phosphono-butane-1,2,4-tricarboxylic acids, i.e. 2-phosphono-butane-1,2,4-tricarboxylic acid, its 3-lower alkyl or carboxyl and/or 4-methyl derivatives, and salts thereof, which possess utility as complex formers for alkaline earth metal ions, active compositions in the form of mixtures of such compounds with solid and liquid dispersible carrier vehicles, and methods for producing such compounds and for using such compounds in a new way especially for forming complexes with alkaline earth metal ions, with other and further objects becoming apparent from a study of the within specification and accompanying examples.

It is known that for the sequestration of alkaline earth metal ions in alkaline medium besides conventional complex formers (such as nitrilotriacetic acid), there may be used phosphonic acids which are capable of preventing the precipitation of substantially insoluble alkaline earth metal compounds. For examples, in German Published Applications (DAS) Nos. 1,198,852 and 1,249,275 and the information given in Journal of General Chemistry of the USSR 24, 121–124 (1954) nitrilo-tris-methylenephosphonic acid, 1-hydroxyethane-1,1-diphosphonic acid and phosphonosuccinic acid have been proposed for this purpose. Further, it is known that in using these phosphonic acids it is desirable to work with less than the stoichiometrically required amount (the so-called "threshold effect") in order to avoid the formation of a hard, insoluble precipitate. However, nitrilotriacetic acid has the disadvantage that it shows no threshold effect and complexes not only alkaline earth metal ions but also heavy metal ions and therefore is objectionable because of the danger of corrosion. 1-hydroxyethane-1,1-diphosphonic acid and nitrilo-tris-methylenephosphonic acid are technologically difficult to produce. The production of phosphonosuccinic acid is technologically simple and a further advantage is the low phosphorus content thereof, but its complex-forming power is less than in the case of the other known compounds mentioned. Among the disadvantages of the known agents are a high phosphorus content and the associated formation of algae in effluents, the danger of corrosion of metal parts, and a sometimes unsatisfactory complex-forming power.

In pending German patent application No. P 20 15 068.0, filed Mar. 28, 1970 (cf. Belgian Pat. No. 764,899) it is taught that α-alkyl-phosphonosuccinic acids are distinguished by a very good complex-forming power for alkaline earth metal ions.

The present invention provides 2-phosphono-butane-1,2,3-tricarboxylic acid compounds of the general formula

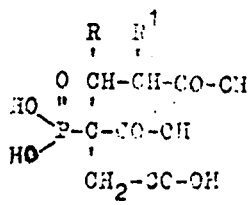
(I)

in which
R is hydrogen, lower alkyl or a carboxyl group, and
$R^1$ is hydrogen or methyl,
as well as their alkali metal, ammonium or amine salts, which compounds have been found to exhibit a strong complex-forming effect on alkaline earth metal ions.

The invention also provides a process for the production of 2-phosphono-butane-1,2,4-tricarboxylic acid compounds of the formula (I) in which a phosphonosuccinic acid tetra-alkyl ester of the general formula

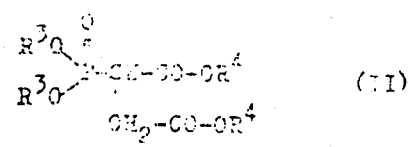
(II)

in which
$R^3$ and $R^4$ are the same or different lower alkyl,
is added to a compound bearing an activated carbon-carbon double bond, of the general formula

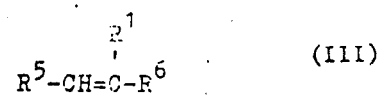
(III)

in which
$R^1$ has the meaning stated above,
$R^5$ is hydrogen, lower alkyl or carboxy lower alkyl, and
$R^6$ is a cyano, carbonamido or carboxyalkyl group,
in the presence of a basic catalyst, and the resulting adduct of the general formula

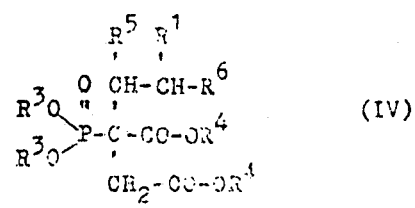
(IV)

is hydrolyzed with aqueous mineral acid.

Surprisingly, the 2-phosphono-butane-1,2,4-tricarboxylic acid derivatives of the formula (I) tend to show a considerably better complex-forming power than the previously known compounds. The substances according to the invention therefore represent an enrichment of the art.

When phosphonosuccinic acid tetramethyl ester and acrylic acid methyl ester are used as starting materials, the reaction course can be represented by the following formula scheme:

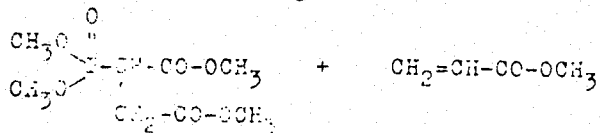

(IIa)                    (IIIa)

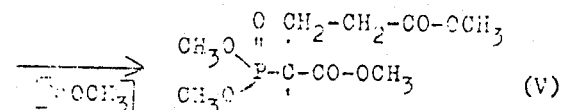

(IVa)

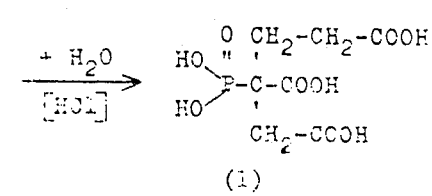

(I)

In the general formula (I) which defines the phosphonosuccinic acid tetraalkyl esters to be used as starting materials. $R^3$ and $R^4$ stand preferably for alkyl of 1 to 4 carbon atoms and especially methyl or ethyl. The compounds and their preparation are described in Journal of the General Chemistry of the USSR 24, pp. 121–124 (1954).

The starting materials of formula (III) which bear activated carbon-carbon double bonds are generally known, as is their preparation.

R is preferably hydrogen or alkyl of 1 to 4 carbon atoms, especially methyl, $R^5$ is preferably hydrogen, alkyl of 1 to 4 carbon atoms, especially methyl or ethyl, carboxymethyl or carboxyethyl. $R^6$ is preferably cyano, carboxymethyl or carboxyethyl.

The reactions can be carried out both without and with diluents. As diluents, all inert organic solvents are suitable. Preferred solvents include hydrocarbons, such as benzene, toluene, xylene; ethers, such as diethyl ether, tetrahydrofurane; and alcohols, such as methanol, ethanol, butanol.

The reaction is carried out with a basic catalyst. For this purpose a strong base may be used. Good results have been obtained for example with alkali metal alcoholates, such as sodium methylate, lithium methylate or potassium butylate, as well as with tetraalkylammonium hydroxides.

The reaction temperatures can be varied within a fairly wide range. In general, the reaction is carried out at about $-20°$ to $+140°C$, preferably $0°$ to $+80°C$.

When carrying out the process, the starting compounds are preferably used in approximately equimolar amounts; about 0.1 mole of the catalyst may be used per mole of starting compounds; the catalyst is preferably added dropwise in alcoholic solution.

The 2-dialkylphosphono-butane-1,2-dicarboxylic acid ester derivatives of formula (IV) may be hydrolyzed by heating with mineral acid, especially hydrochloric acid. Concentrated or dilute aqueous hydrochloric acid may be used. The 2-phosphono-butane-1,2,4-tricarboxylic acid compounds of formula (I), after hydrolysis, are present dissolved in the mineral acid. The mineral acid may be distilled off in a vacuum at temperatures up to 140°C in the case of hydrochloric acid; the anhydrous 2-phosphono-butane-1,2,4-tricarboxylic acid compounds may then be obtained; they are viscous when hot and, in the cold, either crystallize or solidify in glassy form.

The 2-phosphono-butane-1,2,4-tricarboxylic acid compounds according to the invention including the alkali metal and amine or ammonium salts, are distinguished by an excellent complex-forming effect with alkaline earth metal ions. They are therefore eminently suitable as sequestration agents, for example in cleaning agents, such as are used in the food industry for bottle cleaning. The complex-forming power of the compounds according to the invention appears to be substantially higher than that of the phosphorus compounds hitherto used.

The compounds according to the invention may be used as free acids or in the form of their alkali metal, amine or ammonia salts in cleaning agents.

The invention provides a cleaning agent containing as active ingredient a compound of formula (I) in admixture with any diluent or carrier. It may contain the usual additives, such as wetting agents, emulsifier, anitfoaming agents, bleaching agents and/or disinfectants.

The 2-phosphono-butane-1,2,4-tricarboxylic acid compounds according to the invention have a low phosphorus content. Hence the risk of the formation of algae in effluents, which is known to depend on the phosphorus content of the water, is reduced. The following Table 1 shows the phosphorus content of some complex-formers.

Table 1

| Compound | | Wt. % Phosphorus in the molecule |
|---|---|---|
| Nitrilo-tris-methylenephosphonic acid | (known) | 31.1 |
| 1-hydroxyethane-1,1-diphosphonic acid | (known) | 30.1 |
| Tripolyphosphate (sodium salt) | (known) | 25.3 |
| Phosphonosuccinic acid | (known) | 15.7 |
| α-methylphosphonosuccinic acid (German Application P 20 15 068.0) | | 14.6 |
| 2-phosphonobutane-tricarboxylic acid (according to the invention) | | 11.5 |

The invention is illustrated by the following Examples.

EXAMPLE 1

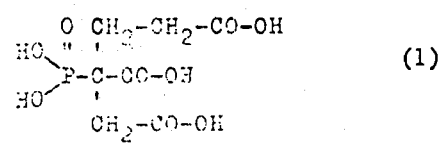

a. To a mixture of 508 g (2 moles) of phosphonosuccinic acid tetramethyl ester and 172 g (2 moles) of methyl acrylate there is added dropwise over 70 minutes, at 12° to 14°C, with stirring and intensive cooling, 0.3 mole of sodium methylate in 100 ml of methanol. The methanol is distilled off by heating under vacuum until temperature of the residue is 80°C. The crude yield of 2-dimethylphosphono-butane-tricarboxylic acid methyl ester-(1,2,4) is 665 g (98% of theory). The compound distills at b.p. 175°–183°C/1 mm Hg.

b. The 2-dimethylphosphono-butane-tricarboxylic acid methyl ester-(1,2,4) so obtained is heated to boiling temperature with 100 ml of dilute hydrochloric acid (2 moles acid/liter) for 18 hours, while distilling off the methanol formed in the hydrolysis. 150 ml of concentrated hydrochloric acid (12 moles acid/liter) are subsequently added to the hydrolysis mixture and it is heated to reflux temperature for a further 18 hours. The reaction solution is then evaporated to dryness in a vacuum (maximum residue temperature 120°C) and diluted to a 50%-strength solution of 2-phosphono-butane-1,2,4-tricarboxylic acid in water. Alkali metal or ammonium hydroxides or carbonates or amines may be added to the solution to form the corresponding salts of the dissolved acid.

EXAMPLE 2

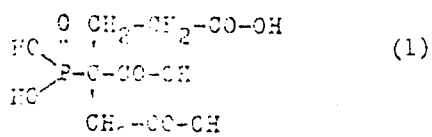 (1)

a. A mixture of 254 g (1 mole) of phosphonosuccinic acid tetramethyl ester and 53 g (1 mole) of acrylonitrile is preheated to 30°C in a three-necked flask with stirrer, dropping funnel and thermometer. 0.1 mole of sodium methylate in 35 ml of methanol is added dropwise over half an hour, the temperature being kept between 30° and 35°C by intensive cooling. Stirring is afterwards effected for one hour at 70°C and methanol is subsequently distilled off under vacuum until there is a residue temperature of 90°C. 302 g of 2-dimethylphosphono-4-nitrilo-butane-dicarboxylic acid methyl ester-(1,2) are obtained.

b. The ester is hydrolyzed to the same product according to the method stated in Example 1 (b), except that the undissolved ammonium chloride formed is filtered before evaporation to dryness.

EXAMPLE 3

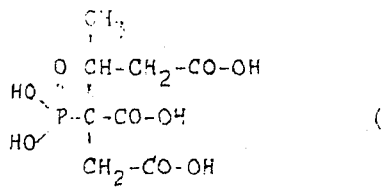 (2)

A mixture of 155 g (0.5 mole) of phosphonosuccinic acid tetraethyl ester and 56 g (0.5 mole) of ethyl crotonate is preheated to 100°C, and 50 ml of a solution of sodium ethylate in ethanol (2.07 moles/liter) are added over 40 minutes at 100°C. While this is being done, further heating is effected. All volatile substances are subsequently distilled off in a vacuum at 100°C. The reaction product (182 g) remaining behind is hydrolyzed according to the method stated in Example 1 (b) yielding 2-phosphono-3-methyl-butane-1,2,4-tricarboxylic acid.

EXAMPLE 4

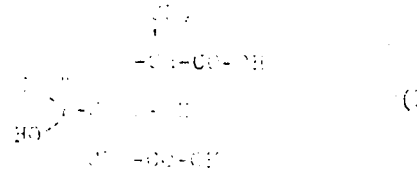 (3)

To a mixture of 254 g (1 mole) of phosphonosuccinic acid tetramethyl ester and 100 g (1 mole) of methyl methacrylate there is added over 30 minutes, with stirring, at 20°C, 0.1 mole of sodium methylate in 35 ml of methanol. Stirring is subsequently effected for 2 hours, the temperature rising to 30°C. After the methanol and the unreacted methyl methacrylate have been drawn off in a vacuum until there is a residue temperature of 80°C, there remains behind a yield of 296 g of crude product. The ester is hydrolyzed in the manner stated in Example 1 (b) to yield 2-phosphono-4-methyl-butane-1,2,4-tricarboxylic acid (i.e. 2-phospono-pentane-1,2,4-tricarboxylic acid).

EXAMPLE 5

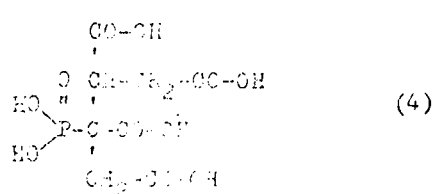 (4)

254 g (1 mole) of phosphonosuccinic acid tetramethyl ester are preheated to 60°C. Over 40 minutes 144 g (1 mole) of dimethyl maleate and 0.13 moles of sodium methylate, dissolved in 40 ml methanol, are added dropwise, with stirring and external cooling. After all volatile substances have been drawn off in a vacuum until there is a residue temperature of 90°C, 312 g of reaction product remain behind. The ester is hydrolyzed in the manner stated in Example 1 (b) to give 2-phosphono-butane-1,2,3,4-tetracarboxylic acid.

The use of the novel compounds is illustrated in the following examples.

EXAMPLE 6

Sequestration power/softening factors

The softening factor represents a measure of sequestration power (complex-forming power). It is determined as follows:

Reagents:
1. Sodium carbonate solution
   100 g of calcined sodium carbonate (analytical grade) are dissolved with distilled water and made up to 1000 ml.
2. Calcium chloride solution
   37.92 g $CaCl_2 \cdot H_2O$ are dissolved in distilled water and made up to 1000 ml.

Carrying out of the titration:
100 ml of the 1%-strength test solution in distilled water are adjusted to pH 13.0 with a solution of sodium hydroxide or hydrochloric acid, depending on the acidity. 2 ml of sodium carbonate solution are added. With constant stirring, the calcium chloride solution is added dropwise until a turbidity is discernible which no longer disperses within one minute. The adjustment of the calcium chloride solution is so effected that 100 ml of a 1%-strength sodium hexametaphosphate solution yields a consumption of 10.0 ml of calcium chloride solution. The consumption of 0.1 ml $CaCl_2$ solution corresponds to a softening factor of 1.

The following Table shows the softening factors of some sequestration agents:

Table 2

Sequestration power/softening factors

| Compound | | Softening factor |
|---|---|---|
| β-phosphonobutyric acid | (known) | 26 |
| β-phosphonopropionic acid | (known) | 30 |
| 1-phosphonopropane-2,3-dicarboxylic acid | (known) | 58 |
| sodium hexametaphosphate | (known) | 100 |
| 1,2-diphosphonosuccinic acid | (known) | 100 |
| phosphonosuccinic acid | (known) | 100 |
| hydroxy-ethane-diphosphonic acid | (known) | 280 |
| nitrilo-tris-methylenephosphonic acid | (known) | 309 |
| 2-phosphono-butane-tricarboxylic acid (1,2,4) | | 350 |

EXAMPLE 7

In a brewery, beer bottles were cleaned with a cleaning agent solution containing 0.02% of 2-phosphono-butane-1,2,4-tricarboxylic acid, 0.03% of orthophosphoric acid, 0.02% of anti-foaming agent and 1.0% of sodium hydroxide. The water hardness was 15 German degrees of hardness. The experiment was continued for five days, and on all those days the bottles left the machine in faultlessly clean condition. They were well wetted and showed no lime coating after drying; neither could any mineral deposit be found on the machine parts.

EXAMPLE 8

In a mineral water plant, there were metered into the after-spray water of the bottle-washing machine 17 g 2-phosphono-butane-1,2,4-tricarboxylic acid per cubic meter of water. The total hardness of the industrial water was 30 German degrees of hardness. Whereas without phosphate inoculation "stone" formation occurred at the spray tubes in the area of the intermediate spraying and the hot-water station within only a few days, such stone formation was suppressed completely by the metered addition of 2-phosphono-butane-1,2,4-tricarboxylic acid. The number of so-called "boiling-over bottles" fell to nil. This is a sign that on the bottles no microscopically small lime crystals settled which would cause the liberation of carbon dioxide from the super-saturated mineral water with which they were filled.

The novel compounds can also be used for preventing both corrosion and the formation of scale in water-conducting systems such as cooling towers, the compounds being added to the water in from about 5 to 100 g/m³, particularly about 30 to 160 ppm. Details of such use are set out in application Ser. No. 362,449, filed May 21, 1973, now pending.

It will be appreciated that the instant specification and examples are set forth by way of illustration and not limitation, and that various modifications and changes may be made without departing from the spirit and scope of the present invention.

What is claimed is:

1. 2-phosphono-butane-1,2,4-tricarboxylic acid compounds of the formula

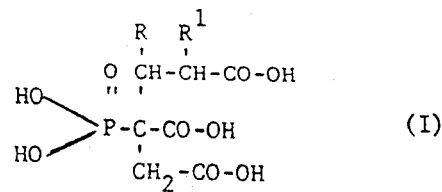

in which
R is hydrogen or lower alkyl, and
R¹ is hydrogen or methyl,
and the alkali metal and ammonium salts thereof.

2. Compound according to claim 1 wherein R is hydrogen or methyl.

3. Compound according to claim 1 wherein such compound is 2-phosphono-butane-1,2,4-tricarboxylic acid of the formula

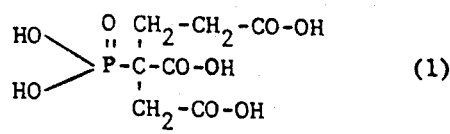

4. Compound according to claim 1 wherein such compound is 2-phosphono-3-methyl-butane-1,2,4-tricarboxylic acid of the formula

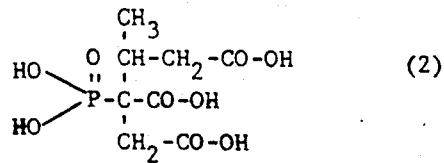

5. Compound according to claim 1 wherein such compound is 2-phosphono-4-methyl-butane-1,2,4-tricarboxylic acid of the formula

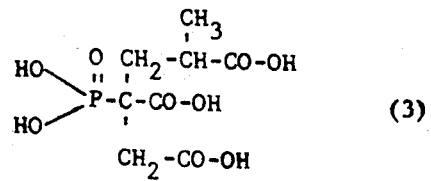

* * * * *